United States Patent
Nakai

Patent Number: 5,100,637
Date of Patent: Mar. 31, 1992

[54] CARBON BLACK FOR COMPOUNDING INTO TIRE TREAD RUBBER

[75] Inventor: Kiyonari Nakai, Aichi, Japan

[73] Assignee: Tokai Carbon Co., Ltd., Tokyo, Japan

[21] Appl. No.: 666,431

[22] Filed: Mar. 11, 1991

Related U.S. Application Data

[63] Continuation of Ser. No. 381,912, Jul. 19, 1989, abandoned.

[30] Foreign Application Priority Data

Jul. 21, 1988 [JP] Japan ................... 63-182379

[51] Int. Cl.$^5$ ............................................. C09C 1/48
[52] U.S. Cl. ................................ 423/445; 524/496
[58] Field of Search .............. 423/445; 524/495, 496

[56] References Cited

U.S. PATENT DOCUMENTS

| | | | |
|---|---|---|---|
| 2,632,713 | 3/1953 | Krejci | 423/458 |
| 2,971,822 | 2/1961 | Williams | 422/151 |
| 3,376,111 | 4/1968 | Stegelman | 423/445 |
| 3,523,812 | 8/1970 | Kraus | 423/449 |
| 3,615,211 | 10/1971 | Lewis | 422/151 |
| 3,725,103 | 4/1973 | Jordan et al. | 106/307 |

(List continued on next page.)

FOREIGN PATENT DOCUMENTS

| | | | |
|---|---|---|---|
| 20705 | 2/1983 | Japan . | |
| 49267 | 3/1984 | Japan . | |
| 1091234 | 5/1986 | Japan . | |
| 1143453 | 7/1986 | Japan . | |
| 1207452 | 9/1986 | Japan . | |
| 2057434 | 3/1987 | Japan . | |
| 2096542 | 5/1987 | Japan | 524/495 |
| 62-77446 | 12/1987 | Japan . | |
| 2290739 | 12/1987 | Japan . | |
| 1-201367 | 8/1989 | Japan . | |

OTHER PUBLICATIONS

W. M. Hess et al., "Specific Shape Characterization of Carbon Black Primary Units", *Rubber Chemistry and Technology*, 1973, pp. 204, 208, 227.

Jean-Baptiste Donnet and Andries Voet, "Carbon Black", *Physics Chemistry and Elastomer Reinforcement*, pp. 200–202, 1991.
ASTM: D2414-88, Standard Test Method for Carbon Black-n-Dibutyl Dibutyl Phthalate Absorption Number, pp. 435–438, 1983.

*Primary Examiner*—Michael Lewis
*Assistant Examiner*—Stuart L. Hendrickson
*Attorney, Agent, or Firm*—Armstrong, Nikaido, Marmelstein, Kubovcik & Murray

[57] ABSTRACT

Carbon black for compounding into a tire tread rubber which has a nitrogen adsorption specific surface area (N$_2$SA) of 120 to 165 m$^2$/g and a dibutyl phthalate absorption of at least 120 ml/100 g which belong to the respective regions of hard grade of carbon black, and has such a value G defined by the following equation (1) as satisfying the following formula (2):

$$G = \left[\frac{\Delta D_{st}}{\overline{D}_{st}}\right]^2 \times \frac{[N_2SA] \times [24M4]}{[IA] \times [DBP] \times [\text{Tint}] \times [CTAB]} \times 10^7 \quad (1)$$

$$200 - 0.555\,[N_2SA] \leq G \leq 255 - 0.555\,[N_2SA] \quad (2)$$

wherein [$\Delta D_{st}$] stands for a difference between two equivalent Stokes diameters at two points on the distribution curve of aggregates at which the absorbance is 50% of the maximum absorbance; [$\overline{D}_{st}$] stands for an equivalent Stokes diameter (nm) at the maximum absorbance of the distribution curve of aggregates; [N$_2$SA] stands for a nitrogen adsorption specific surface area (m$^2$/g); [24M4] stands for a dibutyl phthalate adsorption number of compressed sample (ml/100 g); [IA] stands for an iodine adsorption number (mg/g); [DBP] stands for a dibutyl phthalate absorption (ml/100 g); [Tint] stands for a tinging strength (%); and [CTAB] stands for a cetyltrimethylammonium bromide specific surface area.

1 Claim, 1 Drawing Sheet

U.S. PATENT DOCUMENTS

| | | | |
|---|---|---|---|
| 3,830,774 | 8/1974 | Jordan et al. | 260/42.46 |
| 3,864,305 | 2/1975 | Jordan et al. | 423/445 |
| 3,973,983 | 8/1976 | Jordan et al. | 106/307 |
| 3,988,478 | 10/1976 | Wiggins | 423/449 |
| 4,035,336 | 7/1977 | Jordan et al. | 260/42.47 |
| 4,071,496 | 1/1978 | Kraus | 425/445 |
| 4,154,277 | 5/1979 | Sato et al. | 152/209 R |
| 4,228,143 | 10/1980 | Cheng et al. | 423/445 |
| 4,250,145 | 2/1981 | Pobst et al. | 423/450 |
| 4,267,160 | 5/1981 | Kraus et al. | 423/450 |
| 4,289,743 | 9/1981 | Ruble | 423/450 |
| 4,316,881 | 2/1982 | Pobst et al. | 423/450 |
| 4,360,627 | 11/1982 | Jordan | 106/307 |
| 4,360,627 | 11/1982 | Okado | 106/307 |
| 4,367,208 | 1/1983 | Glasstetter et al. | 423/449 |
| 4,398,582 | 8/1983 | Yuto | 423/445 |
| 4,438,087 | 3/1984 | Casperson | 423/450 |
| 4,459,273 | 7/1984 | Dolkemeyer et al. | 106/307 |
| 4,477,621 | 10/1984 | Sato et al. | 106/307 |
| 4,478,973 | 10/1984 | Misono et al. | 524/496 |
| 4,486,398 | 12/1984 | Casperson | 423/456 |
| 4,500,672 | 2/1985 | Suzuki et al. | 423/450 |
| 4,503,027 | 3/1985 | Cheng | 423/450 |
| 4,540,560 | 9/1985 | Henderson | 423/450 |
| 4,548,980 | 10/1985 | Nagata et al. | 524/495 |
| 4,550,135 | 10/1985 | Iwama | 524/495 |
| 4,569,834 | 2/1986 | West et al. | 423/460 |
| 4,678,830 | 7/1987 | Sato et al. | 524/495 |
| 4,703,079 | 10/1987 | Ahmad et al. | 524/495 |
| 4,721,740 | 1/1988 | Ida | 524/496 |
| 4,784,695 | 11/1988 | Mito et al. | 106/472 |
| 4,786,677 | 11/1988 | Nakai et al. | 524/496 |
| 4,786,677 | 11/1988 | Nakai et al. | 524/496 |
| 4,808,395 | 2/1989 | Yoshimura et al. | 423/456 |
| 4,820,751 | 4/1989 | Takeshita et al. | 524/495 |
| 4,933,107 | 6/1990 | Watanabe | 524/495 |

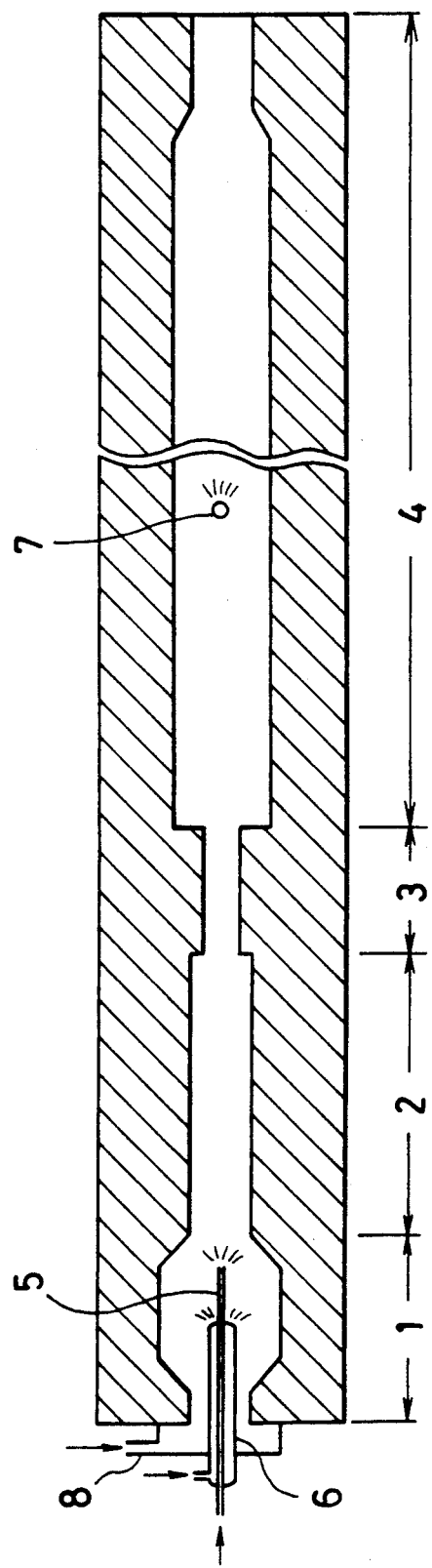

CARBON BLACK FOR COMPOUNDING INTO TIRE TREAD RUBBER

This application is a continuation of application Ser. No. 07/381,912 filed July 19, 1984, now abandoned.

BACKGROUND OF THE INVENTION

The present invention relates to carbon black for compounding into a tire tread rubber, and more particularly to carbon black for compounding into a tire tread rubber which can impart good abrasion resistance and grip performance to a rubber component.

The high-speed and stable travel performances of tires have recently been increasingly required in keeping with development of high-performance automobiles. Under such a circumstance, active investigations are underway with a view to improving the performance of tire tread portions. A particularly urgent need is to develop a tire tread having such a high abrasion resistance as to withstand high-speed stable travel and such a high grip performance as to provide a large road-gripping force.

The effect of reinforcing a rubber by carbon black has heretofore been considered to be largely governed by the specific surface area (particle size) and structure of carbon black. In general, it is known that the larger the specific surface area and structure of carbon black, the higher the abrasion resistance of a rubber containing the carbon black compounded therein.

As for improving the grip performance of a tire tread, there have been proposed a method wherein SBR having a high styrene content is used as a rubber component of a tread portion, and a method wherein a large amount of process oil is incorporated into the rubber component of a tread portion. However, the use of such styrene-rich SBR or process oil can hardly improve the grip performance to a satisfactory degree and presents a problem of notable lowering in the abrasion resistance.

SUMMARY OF THE INVENTION

A first object of the present invention is to provide carbon black for compounding into a tire tread rubber which can impart a good grip performance to a tire tread rubber while securing a high abrasion resistance therefor.

A second object of the present invention is to provide carbon black useful for compounding into a tire tread rubber required to have a high-speed stable travel performance.

BRIEF DESCRIPTION OF THE DRAWINGS

FIG. 1 is a schematic cross-sectional view of an example of an oil furnace to be used for the production of the carbon black of the present invention.

DETAILED DESCRIPTION OF THE PREFERRED EMBODIMENTS

The carbon black of the present invention for compounding into a tire tread rubber has a nitrogen adsorption specific surface area ($N_2SA$) of 120 to 165 $m^2/g$ and a dibutyl phthalate absorption (DBP) of at least 120 ml/100 g which belong to the respective regions of hard grades of carbon black, and such a value G, defined by the following equation (1), as to satisfy the relation of the following formula (2):

$$G = \left[\frac{\Delta D_{st}}{D_{st}}\right]^2 \times \frac{[N_2SA] \times [24M4]}{[IA] \times [DBP] \times [Tint] \times [CTAB]} \times 10^7 \quad (1)$$

$$200 - 0.555\,[N_2SA] \leq G \leq 255 - 0.555\,[N_2SA] \quad (2)$$

wherein [$\Delta D_{st}$]: difference between two equivalent Stokes diameters at two points on the distribution curve of aggregates at which the absorbance is 50% of the maximum absorbance

[$D_{st}$]: equivalent Stokes diameter (nm) at the maximum absorbance of the distribution curve of aggregates

[$N_2SA$]: nitrogen adsorption specific surface area ($m^2/g$)

[24M4]: dibutyl phthalate absorption number of compressed sample (ml/100 g)

[IA]: iodine adsorption number (mg/g)

[DBP]: dibutyl phthalate absorption (ml/100 g)

[Tint]: tinting strength (%)

[CTAB]: cetyltrimethylammonium bromide specific surface area.

The nitrogen adsorption specific surface area ($N_2SA$) of 120 to 165 $m^2/g$ and the dibutyl phthalate absorption of at least 120 ml/100 g, which belong to the respective regions of hard grades of carbon black such as SAF (N110) and ISAF (N220), are prerequisites for the carbon black to impart a high abrasion resistance to a compounding rubber. When the nitrogen adsorption specific surface area ($N_2SA$) is smaller than 120 $m^2/g$, or when the DBP absorption is lower than 120 ml/100 g, carbon black cannot impart a high abrasion resistance to a tire tread. When the nitrogen adsorption specific surface area ($N_2SA$) exceeds 165 $m^2/g$, the workability in dispersing carbon black is notably poor.

The value G derived from the equation (1) is a parameter to associate particle-related properties of carbon black such as aggregate distribution, specific surface area, structure and tinting strength with one another. Values G satisfying the formula (2) are evidently lower per specific surface area than those of conventional grades of carbon black.

When the value G satisfies the formula (2), carbon black can effectively improve the grip performance of a compounding rubber without detriment to the abrasion resistance thereof. In contrast, when the value G is lower than $200 - 0.555[N_2SA]$, the abrasion resistance is notably poor. When the value G exceeds $255 - 0.555[N_2SA]$, no sufficient grip performance can be secured. Thus, in either case, the performance required of a tire tread cannot be satisfied.

A higher abrasion resistance is effectively imparted to a compounding rubber not only as the nitrogen adsorption specific surface area [$N_2SA$] and tinting strength [Tint] of carbon black compounded thereinto are increased, but also as the dibutyl phthalate absorption number, of compressed sample, per dibutyl phthalate absorption, of carbon black compounded thereinto is increased while the surface activity ($N_2SA/IA$) thereof is retained on a high level. On the other hand, the grip performance of a tire tread is effectively improved when the particle size of carbon black is small while the surface activity thereof is suppressed.

The value G as defined in the present invention is a control parameter of these factors. Thus, when carbon black is characterized by a nitrogen adsorption specific surface area [$N_2SA$] of 120 to 165 $m^2/g$, a dibutyl phthalate absorption of at least 120 ml/100 g and a value G satisfying the formula (2), the carbon black can impart simultaneously a high abrasion resistance and a high grip performance as required to a tire tread rubber.

The characteristic values of the carbon black of this invention were measured according to the following methods.

(1) Nitrogen adsorption specific surface area (N₂SA):
ASTM D3037-78 "Standard Methods of Testing Carbon Black—Surface Area by Nitrogen Adsorption" Method B. The N₂SA of IRB No. 5 measured according to this method was 80.3 m²/g. (IRB stands for Industry Reference Black.)

(2) Dibutyl phthalate absorption (DBP):
JIS K6221 (1975) "Method of Testing Carbon Black for Rubber", Section 6.1.2, Method A (corresponding to ASTM D2414-82)

A prescribed quantity of dry carbon black is placed in the mixing chamber of an adsorptometer. Dibutyl phthalate is added dropwise to the carbon black from a buret with mixing. The buret is closed automatically by the action of a limit switch when the torque of the rotor in the mixing chamber reaches a predetermined value. The absorption is calculated from the following equation:

$$DBP = \frac{V}{W_D} \times 100$$

wherein
DBP: absorption of dibutyl phthalate (ml/100 g)
V: volume of dibutyl phthalate added (ml)
$W_D$: quantity of dry carbon black (g)

(3) $\overline{D}_{st}$, $\Delta D_{st}$

A carbon black sample is dried according to JIS K6221 (1975), Section 6.2.1, Method A. The dried carbon black sample is accurately weighed out and dispersed into a 20% aqueous solution of ethanol containing a small quantity of a surface active agent (dispersing agent) to prepare a dispersion of carbon black in a concentration of 50 mg/l. Complete dispersion is accomplished ultrasonically.

Then, the dispersion is subjected to centrifugal classification by a disk centrifuge (made by Joyes Loebl Co., England) set at 8,000 rpm. 10 to 20 ml of a spin liquid (2% aqueous solution of glycerin) is added and then 1 ml of a buffer (aqueous solution of ethanol) is added. Finally, 0.5 ml of the dispersion of carbon black is added by means of a syringe. Centrifugation is started. Simultaneously, a recorder is also started to draw a distribution curve of aggregates.

The $D_{st}$ mode diameter ($\overline{D}_{st}$) is defined as the equivalent Stokes diameter (nm) at the mode (maximum absorbance) of the distribution curve of aggregates, and the range of aggregate size distribution ($\Delta D_{st}$) is defined as the difference (nm) between two equivalent Stokes diameters at two points (nm) on the distribution curve of aggregates at which the absorbance is 50% of the maximum absorbance.

The $\overline{D}_{st}$ and $\Delta D_{st}$ of ASTM D-24 Standard Reference Black C-3 N234 are 80 nm and 60 nm, respectively.

(4) 24M4
ASTM D3493-85a "Standard Test Method for Carbon Black - Dibutyl Phthalate Absorption Number of Compressed Sample."

(5) IA
This value was determined according to the testing method for rubber-compounding carbon black, JIS K6221 (1975), Article 6.1.1. (corresponding to ASTM D1510-81).

Namely, 0.5±0.0005 g of a dried carbon sample was precisely weighed out into a 200 ml Erlenmeyer flask with a stopper, 25 ml of a 0.0473N iodine solution was added thereto, and the resulting mixture was shaken for 1 minute at room temperature at a shaking number of above 120 strokes/min. The carbon black was separated and 20 ml of the filtrate was titrated with a 0.0394N sodium thiosulfate solution (a ml). Separately, a blank test was performed by the same procedure (b ml). The iodine adsorption number per g of the dried carbon black was calculated according to the following equation:

$$IA = (b-a)/b \times (V/WD_D) \times N \times 126.91 \times f$$

wherein
IA: iodine adsorption number (mg/g)
$W_D$: weight of dry carbon black (g)
V: amount of iodine solution added (ml)
N: normality of iodine solution (0.047)
f: factor of iodine solution.

(6) Tint
JIS K6221-82 "Testing Method for Rubber-Compounding Carbon Black" Article 6.1.3. IRB *3 was used as a control sample.

A dry carbon black sample in an amount of 0.1000 g (±0.0002 g) is mixed with 3.000 g of zinc oxide and 1.50 ml of linseed oil by using a Hoover type muller with 125 rotations (25 rotations in one mixing, repeated 5 times) under a load of 6.8 kg (15 lbs). The resulting paste is applied in a prescribed thickness onto a glass plate using a film applicator (0.002 inch). The reflectance (T) of the carbon black paste applied onto the glass plate is measured with a reflection photometer (Densicron, Welch Scientific Co., A9155, reflector head *3832A) which is so adjusted as to indicate 50% reflectivity for the paste of the standard carbon black sample. The tinting strength of the carbon black sample is calculated from the following equation:

tinting strength = 50/T × [tinting strength (%) of standard carbon black)

(7) CTAB
ASTM D3765-80 "Standard Test Method for Carbon Black - CTAB (cetyltrimethylammonium bromide) Surface Area."

The carbon black of the present invention having the aforementioned characteristic properties can be produced by controlling various conditions, such as reaction temperature, reaction time, fuel gas flow rate and residence time for reaction, using, for example, an oil furnace as shown in FIG. 1. This oil furnace comprises an air feed inlet 8 in the tangential direction thereof, a combustion chamber 1 provided with a burner 6 and a feedstock oil spray nozzle 5 both inserted thereinto in the axial direction of the furnace, narrow reaction chambers 2 and 3 extending from the combustion chamber 1, and a broad reaction chamber 4 extending from the reaction chamber 3 and provided therein with a cooling water spray nozzle 7.

According to a customary method, the carbon black of the present invention may be compounded into natural rubber, styrene-butadiene rubber, polybutadiene rubber, isoprene rubber, butyl rubber and various other elastomers such as various synthetic rubbers and blended rubbers which can be reinforced with ordinary carbon blacks. The compounding amount of the carbon black is 25 to 150 parts by weight based on 100 parts by weight of the rubber component, and the carbon black may be compounded together with any other necessary ingredients such as a vulcanizing agent, a vulcanization accelerator, an age resister, a vulcanization aid, a softner and a plasticizer, to provide a rubber composition for tire treads.

Examples of the present invention will now be described together with Comparative Examples.

The methods of measuring various characteristic properties of rubbers in the Examples and Comparative Examples are as follows.

(1) Hysteresis Loss (tan $\delta$) and Dynamic Modulus of Elasticity (E'):
  Hysteresis loss was measured with a viscoelastic spectrometer (manufactured by Iwamoto Seisakusho Co.) under the following conditions:
  test piece: 35 mm long, 5 mm wide, 2 mm thick
  frequency: 50 Hz
  temperature: 25° C.
  dynamic strain $\epsilon$ (amplitude): 1.2%

(2) Abrasion Loss:
  Abrasion loss was measured with a Lambourne abrasion tester (with mechanical slip mechanism) under the following conditions:
  Test piece: 10 mm thick and 44 mm in outside diameter
  Emery wheel: GC type; grain size: #80; hardness: H
  Carborundum added: grain size: #80; adding rate: approximately 9 g/min
  Relative slip ratio of Emery wheel surface to test piece: 24%, 60%
  Speed of revolution of test piece: 535 rpm
  Load on test piece: 4 kg (3) Other Properties All other measurements were made according to JIS K6301-75 "Physical Test Method for General Rubbers". Examples 1 to 4 and Comparative Examples 1 to 4:

Four kinds of carbon black were produced under varied formation conditions using an oil furnace as shown in FIG. 1 which comprises a furnace top having an air feed inlet 8 in the tangential direction thereof and a combustion chamber 1 (400 mm in diameter and 500 mm in length) provided with a burner 6 and a feedstock oil spray nozzle 5 both inserted thereinto in the axial direction of the furnace; narrow reaction chambers 2 and 3 (front chamber: 170 mm in diameter and 500 mm in length, and rear chamber: 150 mm in diameter and 1,000 mm in length) coaxially integrated with the combustion chamber 1; and a broad reaction chamber 4 (300 mm in diameter) extending from the reaction chamber 3.

The feedstock oil used was an aromatic hydrocarbon oil having a specific gravity (15°/4° C.) of 1.073, an Engler viscosity (40°/20° C.) of 2.10, a content of toluene-insolubles of 0.03%, a correlation index (BMCI) of 140 and an initial boiling point of 103° C. The fuel oil used was a hydrocarbon oil having a specific gravity (15°/4° C.) of 0.903, a viscosity (at 50° C.) of 16.1 cSt, a residual carbon content of 5.4%, a sulfur content of 1.8% and a flash point of 96° C.

Tables I and II show the formation conditions and characteristic properties, respectively, of the four kinds of carbon black according to the present invention under Example Numbers. Comparative Examples 1 to 4 in Table II are related to conventional grades of carbon black falling outside the scope of the present invention in respect of the characteristic properties as specified therein.

TABLE I

| Example Nos. | 1 | 2 | 3 | 4 |
|---|---|---|---|---|
| Conditions | | | | |
| Total air feed rate (Nm³/h) | 4200 | 4400 | 4800 | 4600 |
| Fuel oil feed rate (kg/h) | 157 | 206 | 249 | 239 |
| Fuel oil combustion rate (%) | 250 | 200 | 180 | 180 |
| Combustion gas flow rate (m/sec) | | | | |
| through 170 mm-diameter zone | 216 | 226 | 247 | 237 |
| through 150 mm-diameter zone | 277 | 291 | 317 | 304 |
| Feedstock oil feed rate (kg/h) | 831 | 749 | 746 | 624 |
| Reaction residence time (msec)* | 21.3 | 18.5 | 15.0 | 16.3 |

Note
*Residence time (milli second) taken by the formed carbon black containing gas in reaching the water cooling point 7 (FIG. 1).

TABLE II

| | Examples | | | | Comp. Examples | | | |
|---|---|---|---|---|---|---|---|---|
| | 1 | 2 | 3 | 4 | 1 | 2 | 3 | 4 |
| Properties | | | | | | | | |
| N₂SA (m²/g) | 123 | 142 | 150 | 163 | 125 | 140 | 153 | 160 |
| DBP (ml/100 g) | 135 | 124 | 132 | 127 | 128 | 130 | 135 | 130 |
| $\Delta D_{st}$ (nm) | 43 | 42 | 39 | 39 | 47 | 47 | 45 | 42 |
| $D_{st}$ (nm) | 70 | 68 | 65 | 60 | 68 | 70 | 63 | 60 |
| 24M4 (ml/100 g) | 97 | 95 | 96 | 94 | 100 | 99 | 101 | 102 |
| IA (mg/g) | 128 | 146 | 153 | 165 | 120 | 136 | 149 | 158 |
| Tint (%) | 123 | 133 | 140 | 141 | 120 | 129 | 138 | 140 |
| CTAB (m²/g) | 118 | 130 | 136 | 140 | 115 | 132 | 136 | 139 |
| Value G | 180 | 164 | 135 | 156 | 282 | 208 | 209 | 200 |
| 200–0.555 [N₂SA] | 132 | 121 | 117 | 110 | 131 | 122 | 115 | 111 |
| 255–0.555 [N₂SA] | 187 | 176 | 172 | 165 | 186 | 177 | 170 | 166 |

Then, a sample of each carbon black was blended with oil-extended SBR and other components in blending ratios as shown in Table III.

TABLE III

| components | parts by weight |
|---|---|
| oil-extended SBR (rubber extended with 50 parts of oil) | 150.00 |
| carbon black | 75.00 |
| stearic acid (dispersing vulcanization aid) | 1.00 |
| zinc oxide (vulcanization aid) | 3.00 |
| N-cyclohexyl-2-benzothiazolesulfenamide (vulcanization accelerator) | 1.50 |
| sulfur (vulcanizing agent) | 1.75 |

The compound shown in Table III was vulcanized at a temperature of 145° C. to prepared a rubber composition, which was then examined with respect to various rubber characteristics. The results are shown in Table IV.

Methods and conditions for the measurements of rubber characteristics are as follows. Among them, the hysteresis low (tan $\delta$) is an indicator of the grip performance. The higher the hysteresis loss, the higher the grip performance.

TABLE IV

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Properties Abrasion loss amount |  |  |  |  |  |  |  |  |
| LA24 (ml/5 min) | 0.1092 | 0.1020 | 0.1033 | 0.1003 | 0.1083 | 0.1029 | 0.1012 | 0.0998 |
| LA60 (ml/min) | 0.1036 | 0.0970 | 0.0982 | 0.0965 | 0.1015 | 0.0987 | 0.0958 | 0.0968 |
| Hysteresis loss factor (tan δ) | 0.450 | 0.467 | 0.488 | 0.482 | 0.423 | 0.436 | 0.449 | 0.457 |
| Dynamic modulus of elasticity E' ($\times 10^8$ dyn/cm$^2$) | 1.303 | 1.360 | 1.401 | 1.431 | 1.251 | 1.326 | 1.351 | 1.376 |
| Hardness (Hs) | 66 | 68 | 68 | 68 | 66 | 67 | 67 | 67 |
| 300% modulus (kg/cm$^2$) | 95 | 92 | 96 | 89 | 98 | 95 | 92 | 90 |
| Tensile strength (kg/cm$^2$) | 270 | 297 | 310 | 325 | 268 | 293 | 315 | 327 |
| Elongation (%) | 620 | 640 | 620 | 660 | 590 | 620 | 630 | 650 |

As is apparent from the results of Table IV, the rubber compositions of the Examples according to the present invention were improved in the hysteresis loss (tan δ) indicative of the grip performance per specific surface area while securing substantially the same level of the abrasion resistance as those of the Comparative Examples, and moreover were high in the dynamic modulus of elasticity (E') indicative of the drive stability.

What is claimed is:

1. Carbon black for compounding into a tire tread rubber which has a nitrogen adsorption specific surface area (N$_2$SA) of 120 to 165 m$^2$/g and a dibutyl phthalate absorption of at least 120 ml/100 g which belong to the respective regions of hard grade of carbon black, and has such a value G defined by the following equation (1) as satisfying the following formula (2):

$$G = \left[\frac{\Delta D_{st}}{\overline{D}_{st}}\right]^2 \times \frac{[N_2SA] \times [24M4]}{[IA] \times [DBP] \times [\text{Tint}] \times [CTAB]} \times 10^7 \quad (1)$$

$$200 - 0.555 [N_2SA] \leq G \leq 255 - 0.555 [N_2SA] \quad (2)$$

wherein [ΔD$_{st}$] stands for a difference between two equivalent Stokes diameters at two points on the distribution curve of aggregates at which the absorbance is 50% of the maximum absorbance; [$\overline{D}_{st}$] stands for an equivalent Stokes diameter (nm) at said maximum absorbance of said distribution curve of aggregates; [N$_2$SA] stands for a nitrogen adsorption specific surface area (m$^2$/g); [24M4] stands for a dibutyl phthalate absorption number of compressed sample (ml/100 g); [IA] stands for an iodine adsorption number (mg/g); [DBP] stands for a dibutyl phthalate absorption (ml/100 g); [Tint] stands for a tinting strength (%); and [CTAB] stands for a cetyltrimethylammonium bromide specific surface area.

* * * * *